Dec. 29, 1925 1,567,843
W. HAMILTON
AUTOMATIC LENGTH ADJUSTING DEVICE APPLICABLE TO RECIPROCATING
PARTS OF MACHINERY AND THE LIKE
Filed March 6, 1923
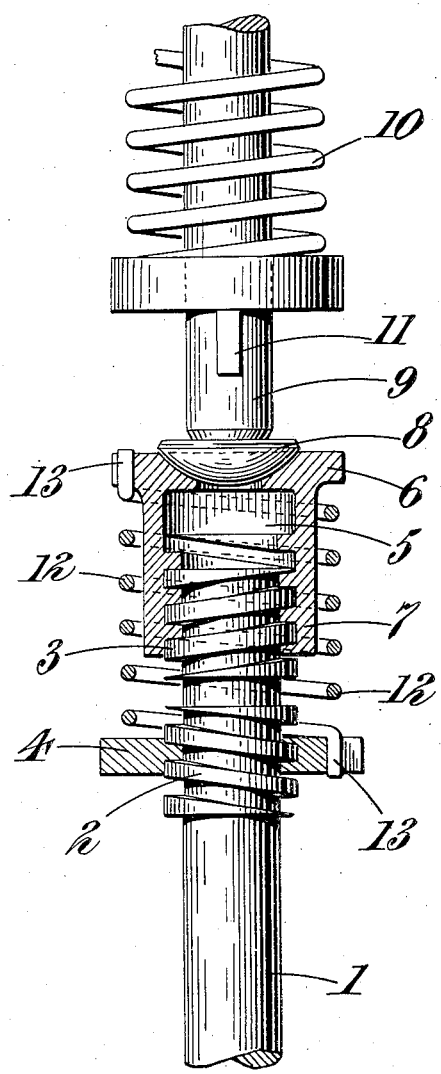
Inventor
William Hamilton
Per Wm H Babcock & Son
Attys Patented Dec. 29, 1925.

1,567,843

UNITED STATES PATENT OFFICE.

WILLIAM HAMILTON, OF CROWBOROUGH, ENGLAND.

AUTOMATIC LENGTH-ADJUSTING DEVICE APPLICABLE TO RECIPROCATING PARTS OF MACHINERY AND THE LIKE.

Application filed March 6, 1923. Serial No. 623,152.

*To all whom it may concern:*

Be it known that I, WILLIAM HAMILTON, a subject of the King of Great Britain, residing at "The Cresset," Crowborough, in the county of Sussex, England, have invented certain new and useful Improvements Relating to Automatic Length-Adjusting Devices Applicable to Reciprocating Parts of Machinery and the like, of which the following is a specification.

This invention has for its object means for automatically compensating for wear or expansion or other factors tending to change or changing the over-all or effective length of such mechanism as the poppet valve, in common use in combustion engines. Its application is, however, not necessarily confined to such devices, but may perhaps be extended to other forms of reciprocating or intermittent thrust systems.

In such systems, up to the present, it has been common practice to provide a gap in the thrust system with means for manually adjusting the spacing from time to time, but the disadvantages of such an expedient are self-evident. It has also been proposed to provide a spring or gravity forced abutment member threaded in a valve stem so as to elongate upon the thrust being relaxed in the system.

My present invention provides means whereby the necessity for a gap is eliminated (although, as will be explained, a certain freedom may be allowed by looseness of fitting in working parts) thus ensuring silent and efficient operation. The device may be applied as an accessory to existing engines or may be part of the original design of an engine. By the term "overall length" in the ensuing description, is meant the length between any two fixed points on the elements comprising the system, taken one on each side of the device where it is applied. Thus in the case of the poppet valve, the overall length might be taken as the distance between the foot of the tappet rod and the valve face. In my previous English Patent 170,509, I showed a device intended to fulfill virtually the same purposes as the present invention, but which was more complicated. I do not intend to claim as the present invention the previously disclosed invention but rather an improved and simplified device.

According to the present invention, which is particularly applicable to poppet valve systems, two rotatable members are provided on an element (preferably on the tappet rod) so threaded thereon that when rotated thereon in the same direction, they relatively approach or recede. The overall length of the system is governed by the position of one of such rotating members. A spring is interposed which tends to resist their relative approach, and, in operation, their relative recession is limited by one of them meeting a stop which is another of the elements of the system e. g., the end of the valve stem, and the members have means for preventing any substantial relative rotation—such as by the spring engaging each positively, forming a torsional coupling between them.

The invention will be better understood by reference to the accompanying drawing in which the device is shown partly in section and partly in elevation.

In the drawing, 1 is the valve tappet rod, bearing threads 2 and 3 of opposite hand. These threads are of fairly quick pitch—I have found about ⅛th of an inch a suitable pitch on a tappet rod ⅜ths of an inch in diameter—and are of square section. On them work two nuts 4 and 5, 4 being a relatively shallow nut on the lower thread and 5 forming the tappet head and by reason of its having to transmit the lifting thrust to the valve, being relatively deep to engage the most possible turns of thread. The nut 5 has conveniently a head 6 and a cylindrical skirt 7. It is formed preferably with a concave depression or recess at the top, to take a partially spherical block 8, having a plane upper surface against which the usual valve stem 9 abuts. The valve spring 10 and cotter pin 11 are of usual type. A helical spring 12 is disposed between the nuts 4 and 5 so as to exert a tendency to force them apart. The ends of the spring are turned up to engage nicks in the nuts at 13 so that the spring 12 transmits a turning force from one nut to the other should either be turned by an exterior force. Any other method of thus interengaging the nuts may be adopted, although it may be found better to have some resilient connection such as is afforded in the example shown and described.

The operation of the device appears to be as follows:—

Assuming that there is no compensation or adjustment necessary, and the engine to which the device is fitted is running, then the intermittent thrusts due to the cam are taken from the tappet rod 1 through the thread 3 to the nut 5, and thence through the block 8 to the valve stem 9. There will be no actual clearance between valve and tappet when the former is on its seat but a free working contact. In practice, this is such as to allow the tappet to be turned with the fingers although no play up and down can be felt. The block 8 is for the purpose of distributing the thrust as evenly as possible through the tappet head 6 and to prevent the "kick" of the valve when closing from exercising any detrimental turning tendency on the tappet head. If desired, it may have some shock-absorbing or sound-deadening insertion to reduce "chatter," excessive vibration, or noise.

The thrust in the system is then released when the valve is closed. Now, if the valve does not seat properly, as for example by reason of heat expansion, or drawing of the stem 9, the load on the tappet is not so released intermittently but is "permanent," and the tappet head is thus subjected to a constant turning influence, due to its being on a thread. It will, in the course of running, slack back down its thread 3, and in so doing will turn the lower nut 4, through the medium of the spring 12, up its thread 2, against the influence of the spring 12, which of course exerts its thrust on the lower nut 4 independently of the changes of force on the upper nut 5. The spring 12 is arranged as far as possible to afford a constant thrust within working limits of compression. I have found in practice that the actual thrust of the spring may be anything from 3 to 12 lbs., the device working equally well through this range, with other dimensions as above and an ordinary commercial valve spring of medium stiffness. It is, however, desirable to use as light a spring as possible. The resistance to turning in the contracting direction of the tappet head, made up of forces due to spring 12 and to friction, are just overcome by the turning moment due to the thrust of the valve stem 9, when the whole is subjected to vibration.

When the "permanent" thrust is removed, as by the nut 5 slackening back, the mere contact above described will be reinstated. If a further shortening of the effective length of the system takes place, then the spring 12 will, by forcing the nuts 4 and 5 apart, run them respectively down and up their threads 2 and 3, until the nut 5 again contacts with the valve stem 9 through the block 8, and the tendency of the spring 12 to turn the nut is then checked, owing to the slight pressure of the contact.

Thus the device keeps a constant fine adjustment automatically. The spring 12 has a continual elongating tendency which is counteracted when the larger force of the valve-returning spring is oppositely imposed, when the device has a shortening tendency, until the larger force is relaxed again when the two tendencies again balance. It will be understood that in practice the vibration assists the above operations, if not being actually essential to the working of the device.

I have considered the feasibility of using for the same purpose as has this invention, one nut with a suitable head, tending always to be forced up a thread as is the nut 5, by a spring. This is not a practical proposition. The second nut would appear to be essential to the working of the device, and this will be recognized if the device be considered as one which turns back or shortens in one direction under a large force, and to return or extend upon the reinstatement of a much smaller force. In the former case the external force (the valve thrust) has to turn two nuts, each on a thread of given pitch, the lower one working in addition against a turning moment (due to tappet spring 12). When this is happening, the upper nut is against the other face of its thread and so the spring has no turning moment on it. In the latter case, that of extension, the two nuts with the spring set up a turning moment equal to that which would be set up by a single nut with the same spring, but the pitch of the thread doubled. A single nut clearly cannot fulfill both these functions.

Modifications in the construction of the device may be made without departing from the spirit of the invention. For example, the nut 5 may be allowed axial play on the thread 3 of a predetermined amount, to allow a certain latitude of operation, if such is desirable. This "play" might, for example, take the place of the valve clearance frequently allowed, but it is not at present deemed necessary. The threads may be suitably roughened to increase frictional resistance to the turning of a nut or nuts, under some circumstances.

I claim:

1. Automatic adjusting means for the purposes set forth, comprising a threaded member, two members threaded thereon, and a spring interposed between said two members and connected thereto, so that when rotated in unison together, they move relatively to each other, the overall length of the system to which the adjusting means are applied being governed by the position of one of such rotating members, as disclosed.

2. Automatic adjusting means for the purposes set forth, comprising a threaded member, two members oppositely threaded thereon, and a spring interposed between said members and connected thereto and tending always to thrust the rotatable elements axially apart, the spring itself preventing any substantial relative rotation between said elements, by engaging both positively.

3. Automatic adjusting means for the purposes set forth particularly adapted for adjusting poppet valve systems, comprising a tappet rod, a tappet head threaded thereon, a member oppositely threaded on said rod, a helical spring engaging positively with said head and said member and interposed under compression therebetween, and a floating block carried by said tappet head to prevent the valve stem from exerting any turning force on said tappet head.

4. An adjustable element comprising a threaded part, and two members engaging respectively threaded portions of said part and adapted to move relatively toward and away from each other axially of said part, in combination with resilient means associated with both of said members to transmit rotary movement from one of said members to the other and in the same rotary direction, whereby the rotary movement of one said member will cause the simultaneous rotary movement of the other member in the same rotary direction, whereby said members will be caused to move relative to each other in opposite directions axially of said part.

5. An adjustable element comprising a threaded part, and two members engaging respectively threaded portions of said part and adapted to move relatively toward and away from each other axially of said part, in combination with means for causing the simultaneous rotation of said members and their relative movement in opposite directions axially of said part.

6. An automatically adjustable element comprising a part and two members mounted to rotate about said part and to move axially thereof to alter the operative length of said element as a whole, in combination with resilient means for causing the simultaneous rotation of said members and their relative movement in opposite directions axially of said part.

WILLIAM HAMILTON.